UNITED STATES PATENT OFFICE.

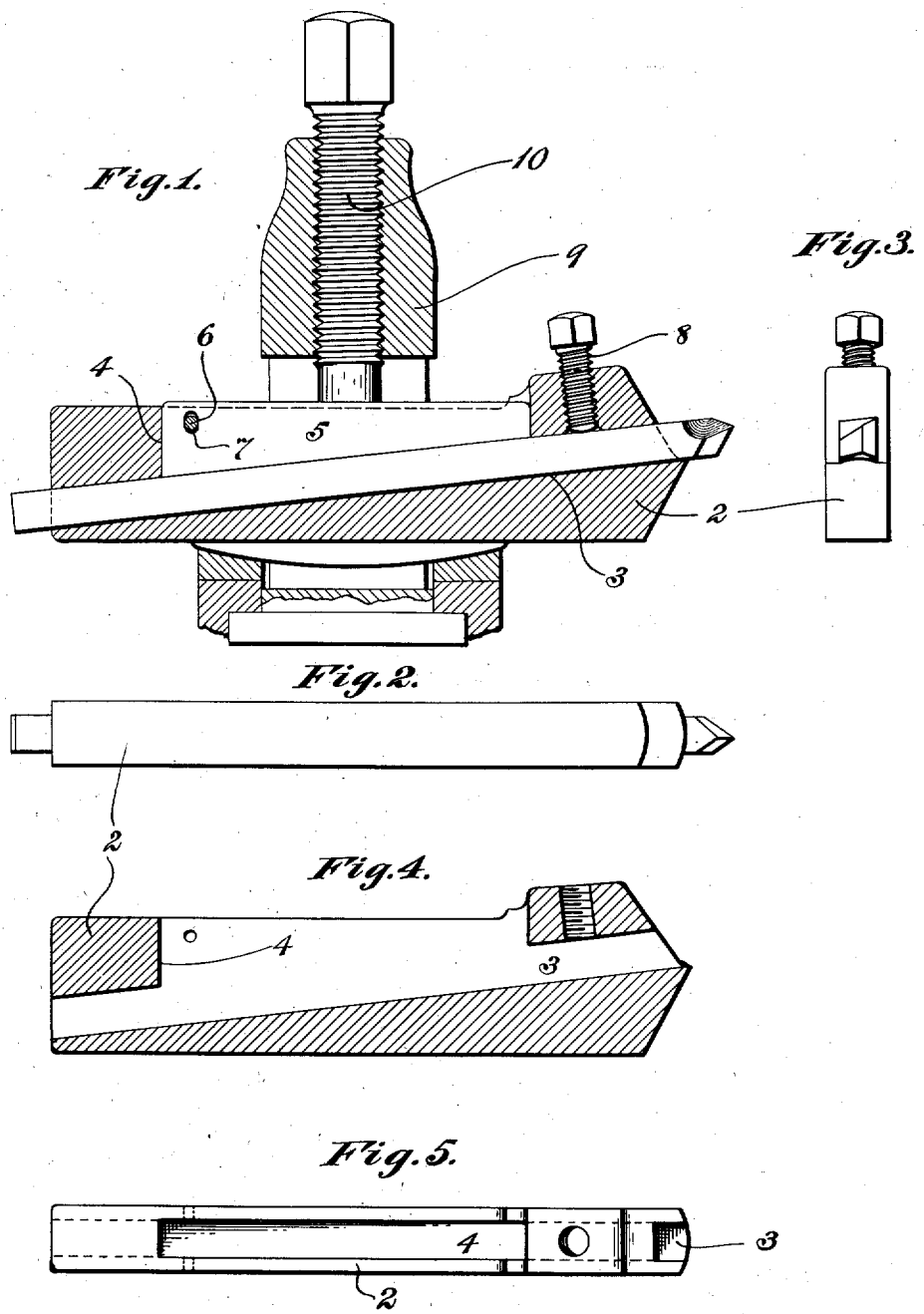

PETER B. CHRISTENSEN, OF NEW BRITAIN, CONNECTICUT.

TOOL-HOLDER.

989,117.  Specification of Letters Patent.  Patented Apr. 11, 1911.

Application filed April 15, 1908. Serial No. 427,104.

*To all whom it may concern:*

Be it known that I, PETER B. CHRISTENSEN, a citizen of the United States, residing at New Britain, in the county of Hartford and State of Connecticut, have invented certain new and useful Improvements in Tool-Holders, of which the following is a specification.

This invention relates to tool-holders and the object of the invention is to provide a simple and effective article of this character having means associated therewith for positively holding the tool in position and against end thrust and chattering.

A tool-holder embodying my invention may be employed with advantage in many different connections and is of especial utility when employed in connection with metal-working machines such as lathes.

In the drawings accompanying and forming part of this specification I have represented in detail one form of embodiment of my invention which to enable those skilled in the art to practice the same will be set forth at length in the following description while the novelty of the invention will be included in the claims succeeding said description.

Referring to said drawings, Figure 1 is a sectional side elevation of a tool-holder including my invention, represented as supported by a tool-post and shown as carrying a turning tool of familiar type. Fig. 2 is a bottom plan view of said tool-holder. Fig. 3 is a front end elevation of the same, and, Fig. 4 is a longitudinal section and Fig. 5 a top plan view of the stock.

Like characters refer to like parts throughout the several figures.

The tool-holder involves in its make-up a stock or body portion which may be of any desirable shape; it is represented as somewhat elongated and may be made from any suitable material such as tool steel, machine steel or of composite construction. Such a stock is shown in the drawings and is denoted by 2. Said stock 2 is shown as having a passage as 3 extending the complete length of the same and which is designated by 3. Said passage may be of any desirable form cross-sectionally although it is shown as being practically rectangular and of uniform cross sectional area throughout its entire length. I prefer that the passage extend angularly with respect to the longitudinal axis of the stock and the object for this will be hereinafter made evident.

The stock 2 in addition to the tool-receiving passage 3 has a slot as 4 intersecting or opening into said passage and which is adapted to receive a suitable clamping member for the tool. I have shown such a clamping member at 5 and it fits comparatively closely in the slot but not too closely to prevent clamping action thereof. The slot 4 is represented as being located in the upper side of the stock and it is shallower at the forward end than at the rear end. In like manner the clamping member or block is shallower at its forward end than at its rear, the under face of said clamping-member or block being upon a bevel or an angle which coincides substantially with the angular relation of the passage 3, by virtue of which said clamping member when in its working relation can hold the tool with a wedge-like action.

I prefer not to rely on the simple fit of the clamping member or block 5 in the slot 4 to prevent the former being displaced and thereby lost when the tool-holder as a unit is moved from place to place. Positive means are shown for operatively connecting the clamping-member or block with the stock and may consist of a pin as 6, rigidly connected with the stock 2 and bridging or crossing the slot 4. Said pin 6 projects through an elongated slot as 7 in the clamping member or block, the slot being elongated vertically or transversely of said clamping member by reason of which the free movement of the clamping member toward and from its operative or working position is in nowise affected. It will be obvious, however, that the tool-holder can be safely taken from a tool-post or other supporting part without possibility of the clamping member or block being lost.

When downward pressure is exerted on the clamping member or block 5, the latter has a wedge-like action on the tool and owing to the angular disposition of the passage 3, end thrust of the tool is efficiently resisted. The clamping member or block when set prevents chattering and all lateral and like objectionable movements of the tool.

I have represented as tapped through the forward upper side of the stock 2 a screw as 8, the tip or lower end of which is adapted to engage against said tool to hold the latter firmly in an adjusted position while the clamping member, block or tongue 5 is being set. The tool can be adjusted readily longitudinally of the passage 3, the clamping-member or block 5 being at this time in an inoperative position and when the adjustment is obtained the screw 8 will be turned home after which the clamping member or block 5 will be set to retain the adjustment and maintain the tool against motion relatively to its holder in all directions. In fact the tool will be as solidly held as though it were integral with its holder.

In Fig. 1 of the drawings the tool-holder is shown as mounted in a tool-post 9 which is a familiar device in metal-working machines and particularly lathes for which reason a detailed description of said tool-post is unnecessary any more than to make reference to its binding-screw 10 which in the present case is the medium which forces the clamping-member or block 5 to its operative position.

In operation a tool will be inserted in the passage 3 of the stock 2 after which the tool will be adjusted as occasion may require. The tool-holder will then be mounted in the tool-post 9, the screw 10 at this point being elevated. When the tool-holder is positioned, said screw 10 will be run down to an extent sufficient to cause the clamping-member or block 5 to bind solidly and firmly against the tool. If desired the adjustment of the tool can be accomplished after the tool-holder is mounted in the post and before the clamping member is set. The invention, however, does not concern these features but resides in a stock of novel character and means connected therewith whereby a tool can be substantially held while doing its work.

Ordinarily a tool is held at but one place; I provide for the tool being held at several places. The clamping member 5 obtains a wide bearing on the tool and it may be held to its work by the customary screw of the tool-post. In addition to this the screw 8 also holds the tool by reason of which said tool can remove a chip of considerable size and not be displaced. The passage which receives said tool extends entirely through the stock and an advantage follows this, in that I can use a tool of unusual length and can grind the cutting portion of the tool as the same wears away until said tool is reduced to a mere stub. In the latter condition a piece of steel or like material of a cross sectional shape the same as that of the tool can be passed through the rear of said passage and can be firmly clamped in position to back up the tool.

It will be clear that the tool-holder comprises a stock having a longitudinally extending passage, a slot intersecting said passage to receive a clamping member for engaging the tool, and a tapped hole in advance of said slot by virtue of which two clamping devices can act against the said tool. In the present instance said stock is made elongated and both the slot and tapped hole extend into the same from the same surface thereof this surface being preferably the upper one so that the rear clamping member can be engaged by the customary screw of the usual tool post while a second screw can hold the tool forward of this place.

I do not limit myself to the precise construction hereinbefore described and illustrated in the accompanying drawings; certain variations may be adopted within the scope of my claims.

What I claim is:

1. A tool-holder comprising a solid stock having a longitudinal straight passage extending the complete length of the same and at an angle to the longitudinal axis thereof said passage being of uniform cross sectional area throughout its entire length, an elongated slot intersecting said passage between the ends of said stock, and a tapped hole disposed at an inclination and opening into said passage forward of said slot, combined with a screw fitted into said tapped hole, a clamping block freely fitted in said slot in a direction transverse to said axis, deeper at the rear than at the front, the underside of said block being on an inclination corresponding with that of said passage, and a pin movably connecting said block and stock one of the two last mentioned parts having a slot to receive said pin, said slot being elongated in the direction of movement of said block.

2. A tool holder of the character set forth, comprising a body portion having a recess extending through three sides thereof and continuing throughout the full length of the holder and adapted to receive the tool, and a tongue movably secured to said body portion in said recess and adapted to have its side opposed to the bottom of said recess engage longitudinally with the tool and having its opposite side extending beyond the body portion, the arrangement being such that tools of greater length than the holder may be inserted therein and clamped by means of said tongue.

In testimony whereof I affix my signature in presence of two witnesses.

PETER B. CHRISTENSEN.

Witnesses:
L. R. SPENCER,
F. E. ANDERSON.